United States Patent [19]

Nakayama

[11] Patent Number: 5,059,775
[45] Date of Patent: Oct. 22, 1991

[54] SLIP AND METHOD OF AND APPARATUS FOR AUTOMATIC READING OF THE SLIP

[75] Inventor: Mamoru Nakayama, Urayasu, Japan

[73] Assignee: ICS & Trading Co., Ltd., Japan

[21] Appl. No.: 177,595

[22] Filed: Apr. 1, 1988

[30] Foreign Application Priority Data

Apr. 17, 1987 [JP] Japan .................................. 62-93123
Apr. 30, 1987 [JP] Japan ................................. 62-104822
Oct. 14, 1987 [JP] Japan ................................. 62-257384

[51] Int. Cl.$^5$ ............................................. G06K 7/10
[52] U.S. Cl. .................................... 235/456; 235/494
[58] Field of Search ............... 235/455, 456, 470, 494, 235/495

[56] References Cited

U.S. PATENT DOCUMENTS

| | | | |
|---|---|---|---|
| 3,632,995 | 1/1972 | Wilson | 235/494 |
| 4,408,121 | 10/1983 | Galatha | 235/494 |
| 4,430,563 | 2/1984 | Harrington | 235/456 X |
| 4,736,109 | 4/1988 | Dvorzsak | 235/456 X |
| 4,864,111 | 9/1989 | Cabili | 235/456 X |

FOREIGN PATENT DOCUMENTS

53-26945 8/1978 Japan .

*Primary Examiner*—David Trafton
*Attorney, Agent, or Firm*—Lorusso & Loud

[57] ABSTRACT

A slip, a method of automatic reading of the slip, and an apparatus used therefor comprising a slip with delineated thereon a control mark made up of line segments of different lengths sequentially arranged in a line for representing a kind of format, information marks spaced apart from the control mark, each thereof being made up of line segments of different sizes arranged sequentially in a line, for representing task data, and information marks spaced apart from the information marks representing numerical data consisting of regions where numerals are written in and regions where bar patterns are written in, a scanning device receiving the slip as input thereto and outputting image data therefrom, a file unit previously storing therein formats corresponding to control marks, criterion coordinates and criterion numerical values corresponding to information marks representing task data, and criterion coordinates corresponding to information marks representing numerical data, read only memories storing therein in advance image data of numerals 0–9 and image data of predetermined bar patterns corresponding to the numerals 0–9, and a central prcessing unit for specifying the kind of the slip by comparing the image data with data from the file unit, deciding whether or not following data should be taken in, and comparing the image data with image data from the read only memories thereby to recognize numerals written in the information marks representing the numerical data.

6 Claims, 7 Drawing Sheets

| \_ | \_ | \_ | 1011 : TRANSFER SLIP | |
|---|---|---|---|---|
| 1 | $X_1$ | $Y_1$ | ADDRESSEE | 1 0 1 0 |
| 2 | $X_2$ | $Y_2$ | SENDER | 0 1 1 0 |
| 3 | $X_3$ | $Y_3$ | AMOUNT BOX | |
| 4 | $X_4$ | $Y_4$ | BANK ACCOUNT NO. BOX | |
| 5 | $X_5$ | $Y_5$ | DATE BOX | |

FIG. 6

| | | 1011 TRANSFER SLIP $\swarrow^{15}$ | | |
|---|---|---|---|---|
| $x_1$ | $y_1$ | 1010 | $x_1 - X_1 = l_1$ | $y_1 - Y_1 = m_1$ |
| $x_2$ | $y_2$ | 0110 | $x_2 - X_2 = l_2$ | $y_2 - Y_2 = m_2$ |
| $x_3$ | $y_3$ | AMOUNT BOX | $x_3 - X_3 = l_3$ | $y_3 - Y_3 = m_3$ |
| $x_4$ | $y_4$ | BANK ACCOUNT NO. BOX | $x_4 - X_4 = l_4$ | $y_4 - Y_4 = m_4$ |
| $x_5$ | $y_5$ | DATE BOX | $x_5 - X_5 = l_5$ | $y_5 - Y_5 = m_5$ |

SLIP AND METHOD OF AND APPARATUS FOR AUTOMATIC READING OF THE SLIP

BACKGROUND OF THE INVENTION

1. Field of the Prior Art

The present invention relates to a slip used for accounting and method of and apparatus for automatic reading and recognition of such a slip received through facsimile transmission.

2. Description of the Prior Art

There has been in practice a system in which handwritten slips or statistic data are read by an optical character recognition apparatus or facsimile unit whereby the data are input to a data processor such as a computer. As a method for inputting an incoming signal transmitted through a facsimile system or the like to a data processor such as a computer, one disclosed in Japanese Patent Publication No. 53-26945 is known.

Figure 8:
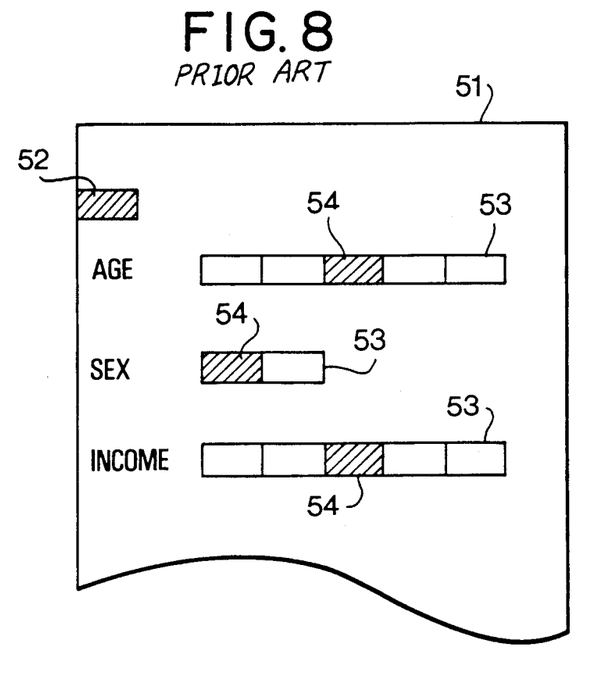
FIGS. 8 and 9 are diagrams showing pattern inputting sheets of a prior art automatic reading system.
Figure 9:
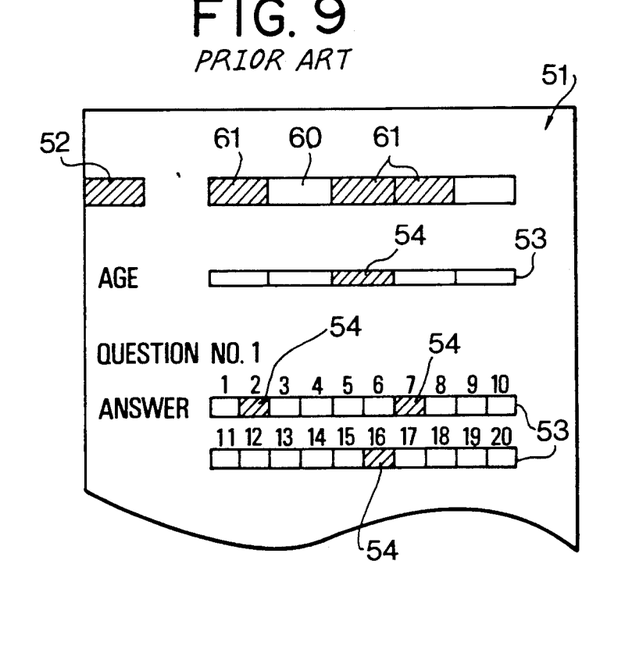

Referring to FIGS. 8 and 9, it is known in the prior art that a slip 51 can be scanned by a facsimile unit, not shown, and only the portion corresponding to the position of a box 53 is read by an input unit, whereby it is detected whether or not there is a mark 54 in the box 53. The position of the box 53 is recognized by counting the number of pulses of a clock signal to be started at the leading edge of a detection signal of a start mark 52 on the slip 51.

However, conventional numeral recognition apparatus have not yet been made competent for a full automatic operation. Slips for use in payment and receipt of money in banks or the like, in particular, are required to be 100 percent accurate because banks have the public as their customers. Therefore, even now, such slips are handled completely dependent upon inputting by an operator using a keyboard.

With conventional automatic input systems, there has been such a problem, when the synchronism with the clock pulses is disturbed by some external disturbance after the start of reading the start mark 52, that it becomes difficult to correctly locate the position of the box 53 and the detection of the mark 54 results in a failure, and as a result the efficiency in data transmission is lowered.

There has also been such a problem that correct reading is made impossible when there are present some stains in the marks 52, 54 or their color is faded to some grayish color.

In the case of the slip 51 of FIG. 9, it is arranged such that decision of type of the format of the slip 51 is made according to a written classification mark 61 in a classification box 60, and therefore, the classification mark 61 has to be written into a correct position of a predetermined region in the classification box 60. Therefore, for the sake of safety, such an arrangement has been only applicable to a simple slip system.

Thus, there has not been existent such an accurate apparatus for numeral recognition that enables a signal from a slip for payment and receipt of money transmitted through a facsimile unit or the like to be input to a data processor such as a computer directly. There has been no way to input data from the slip other than relying upon assistance of human power furnished by an operator.

SUMMARY OF THE INVENTION

The present invention was made in view of the foregoing problems, and accordingly, it is an object of the present invention to provide a slip which will be read correctly at a high order of accuracy and provide easy checking for any error or omission in entry made therein. It is another object of the present invention to provide a slip which will enable accurate reading of information and correct recognition of numerals entered therein even if there is present certain noise due to external disturbance so that a signal relative to payment and receipt of money incoming through facsimile transmission or the like may be input automatically, without the need of human power, to a data processor, as well as to provide method of and apparatus for the relative automatic reading with the use of the slip.

To achieve the aforementioned objects, a slip of the present invention includes delineated thereon a control mark made up of unit patterns varied in size and sequence of arrangement such as, for example, a linear arrangement of segments of lines of varied lengths, information marks for data transmission arranged in the rear of the aforesaid control mark made up of linear arrangements of segments of lines whose lengths are varied in sequence of arrangement, and information marks for data to be processed arranged in the rear of the aforesaid information marks, each thereof being made up of a region for entering numerals therein and its corresponding region for drawing a plurality of bar patterns therein. In the present invention, it is further arranged such that the slip is subjected to photoelectric conversion whereby image data are generated, which image data are subjected to data transfer to be input to an automatic input unit, wherein coordinates of the control mark and both the information marks on the slip are calculated from the image data. Then, dimensions of adjoining line segments of the control mark are compared with one another in sequence of the arrangement whereby a binary numeral is calculated, and thereupon, a format corresponding to the binary numeral is read out of a file unit.

From the format, criterion coordinates and binary numerals of the information marks for the data transmission as well as criterion coordinates of the information marks for the data to be processed are read out. The calculated coordinates are compared with the criterion coordinates for both of the information marks, and according to the result of the comparison, it is determined whether or not subsequent data are to be taken in from the slip. Then, from the information marks for data transmission, binary numerals are calculated through comparison of dimensions of adjoining line segments in sequence of the arrangement and the binary numerals are compared with the criterion binary numerals, and according to the result of the comparison, it is determined whether or not subsequent data are to be taken in from the slip. Thereupon, the image data of the information marks for the data to be processed are divided into portions for numerals and for bar patterns, whereupon the image data of a numeral is compared with a predetermined criterion numerical image, whereby the entered numeral is recognized directly.

The image data of a bar pattern is also compared with a predetermined bar pattern image, whereby a numeral corresponding to the bar pattern is recognized. Then, the above described directly recognized numeral is compared with the numeral recognized by the correspondence just above, and thereby, the numeral entered in the information mark box for the data to be processed is finally recognized.

The present invention functions in the following manner. Image data photoelectrically converted from a slip are transmitted through a line to be input to an automatic input unit. A binary numeral relative to a control mark is calculated from the image data, whereby a format corresponding to the binary numeral is read out from a file unit, and also, coordinates on the slip of two sets of information marks are calculated. Criterion coordinates and binary numerals for each mark are read out from the format, and thereupon, the calculated coordinates are compared with the criterion coordinates for both of the information marks. According to the result of the comparison, whether or not subsequent data should be taken in from the slip is determined. Then, binary numerals for the information marks for data transmission are calculated and these binary numerals are compared with the criterion binary numerals. According to the result of the comparison, it is again determined whether or not subsequent data should be taken in from the slip. Then, relative to the information mark representing numerical data, image data of its numeral is compared with a criterion numerical image so that the entered numeral is directly recognized. Also, the image data of its bar pattern is compared with a criterion bar pattern image and the numeral corresponding to the bar pattern is recognized. Thereupon, the above directly recognized numeral and the recognized numeral by the correspondence just above are compared with each other, so that the numeral entered in the information mark representing the numerical data is finally recognized.

DESCRIPTION OF THE PREFERRED EMBODIMENTS

An embodiment of the present invention will be described below with reference to accompanying drawings.

Figure 1:
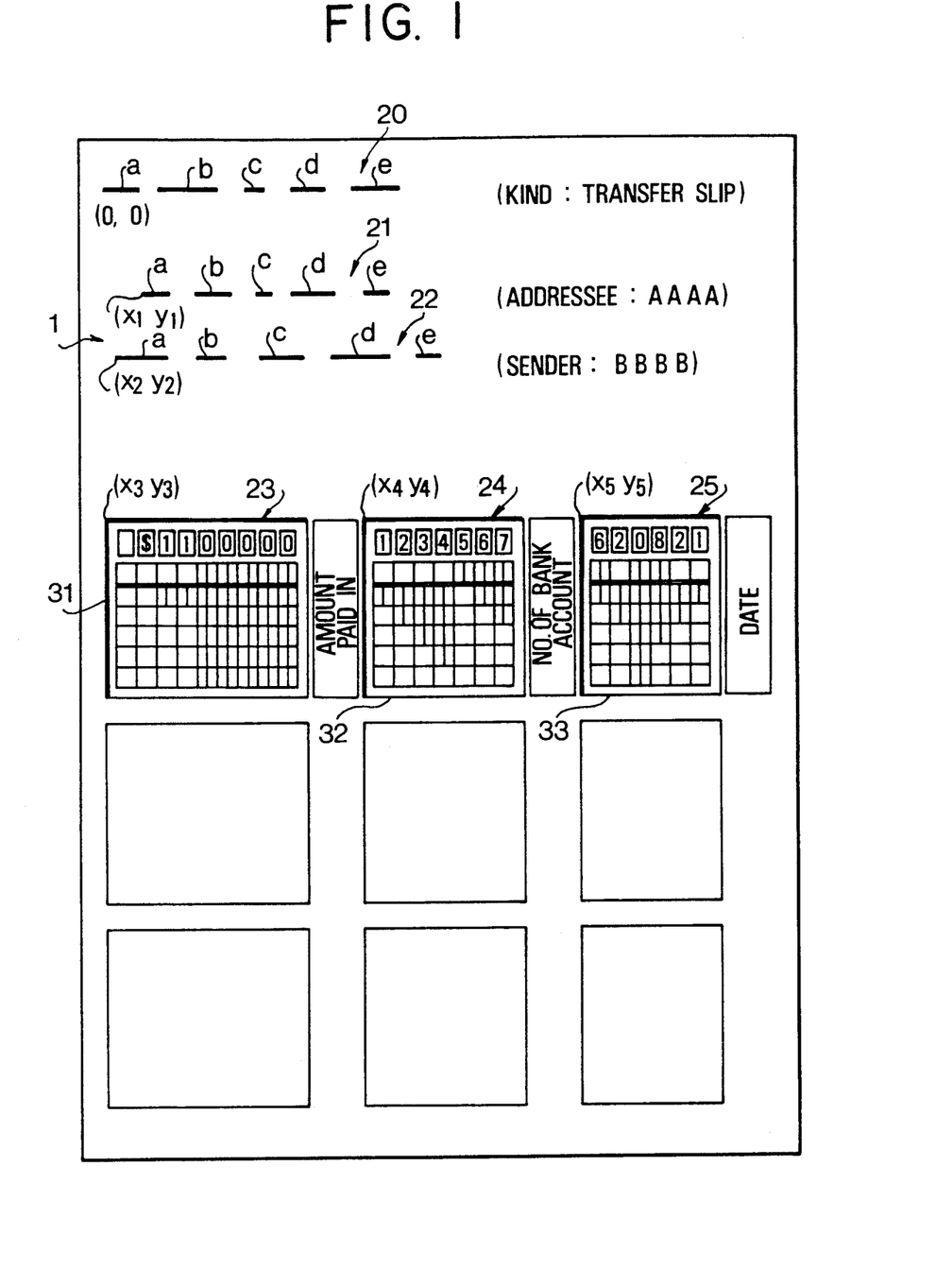
FIG. 1 is an overall view of a slip according to the present invention.

FIG. 1 is a diagram showing a format of a slip for use in inputting of data in the present invention, wherein 1 denotes a sheet of the slip of which size is optional. On the sheet 1, there is written or printed a classification mark 20 as a control mark. The classification mark 20 is made up of unit patterns such as five line segments a, b, ..., e of different lengths horizontally arranged in succession, which are to be subjected to a sequential comparison as to relative length between preceding one and subsequent one.

That is, of this classification mark 20, the segment a is compared, in length, with the preceding "0", or the segment a is directly compared with the segment b, and then, the segment b is compared with the segment c. Similar comparisons are made on until the segment d is compared with the segment e, whereby relative lengths are sequentially determined.

The classification mark 20 is the mark to specify the kind of the slip, which, in the present example, is provided with an indication "Transfer Slip" at the corresponding position so that the user can identify the kind of the slip at a glance. Below the classification mark 20 at a predetermined distance therefrom, there is delineated an information mark 21 made up of line segments for representing task data. Which task data is for the addressee. Below the information mark 21 at a predetermined distance therefrom, there is delineated an information mark 22 made up of line segments for representing another task data, which task data is for the sender.

The information marks 21-22 are ones for the transmission of the data, and each thereof is formed, the same as the classification mark 20, of five line segments a, b, ..., e of different lengths horizontally arranged in succession. These segments a, b, ..., e are sequentially compared, the same as in the case of the classification mark 20, as to relative length between preceding one and subsequent one. Below the information marks 21-22, there are delineated information marks 23-25 for representing numeral data arranged in frames. These marks are ones for the data to be processed. That is, for example, the information mark 23 constitutes a box indicating the amount, the information mark 24 constitutes a box indicating the bank account number, and the information mark 25 constitutes a box indicating the date, and in the positions corresponding to the information marks 23, 24, 25, there are provided indications of "Amount Paid In", "Number of Bank Account", and "Date", respectively, so that users can recognize them at a glance.

The information marks 23, 24, 25 are horizontally arranged one after another and provided with rectangular frames 31, 32, 33, respectively, of which two sides meeting at the top left-hand corner are given in thich lines.

For any specific classification mark 20, the coordinates (x1, y1), (x2, y2), ...,(x5, y5) of the written positions of both the segment and the frame information marks 21-25, or the positions of the left-hand ends of their first line segments and the points at the top left-hand corners where the two sides meet are previously specified.

Figure 2:
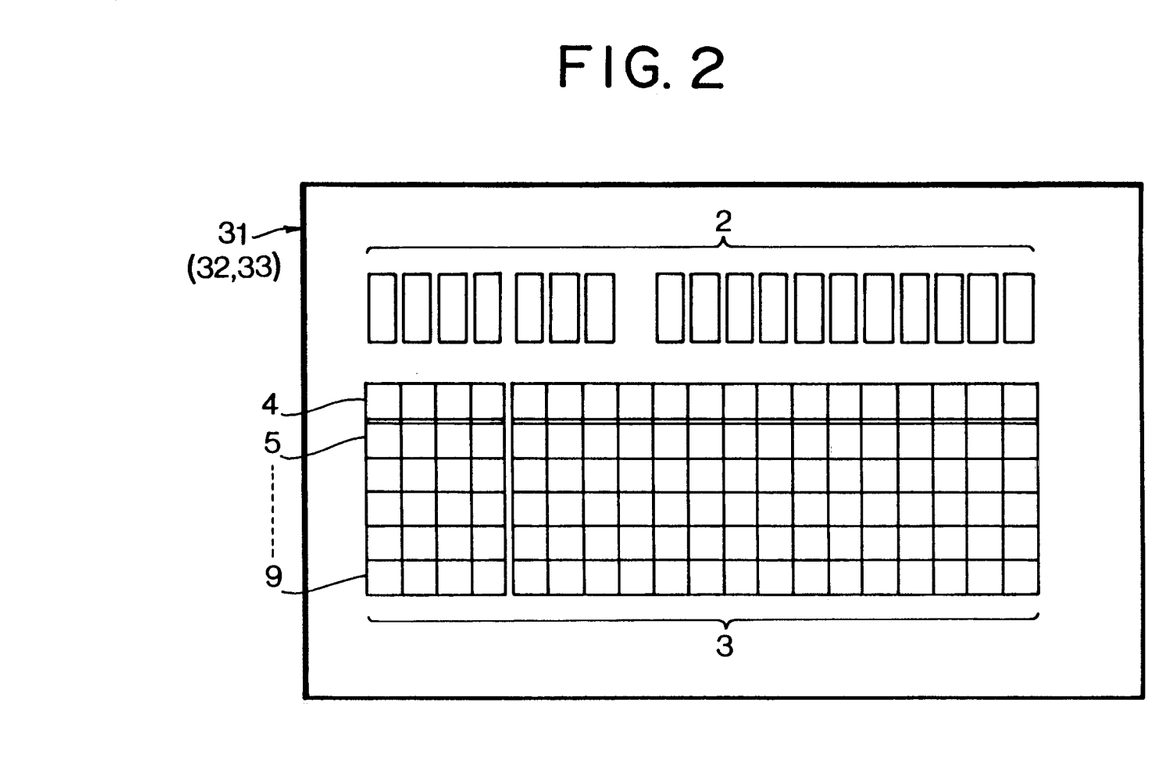
FIG. 2 is an enlarged view of an information mark for data to be processed according to the present invention.

Now, a detailed description of general form of the frame information mark 23-25 will be given with reference to FIG. 2 and FIG. 3.

With each of the frames 31, 32, 33, there are a plurality of rectangles or squares arranged in a matrix. Below the squares 2 arranged in the first line, there are arranged, at a predetermined distance therefrom, rectangular columns 3, each thereof opposing a side of each of the squares 2. Each of the columns 3 is divided longitudinally into six squares, the first square 4, second square 5 to the sixth square 9, naming them from the closet one to the square 2. The boundary between the first squares 4 and the second squares 5 is indicated by a specially thich line or double lines.

Figure 3:
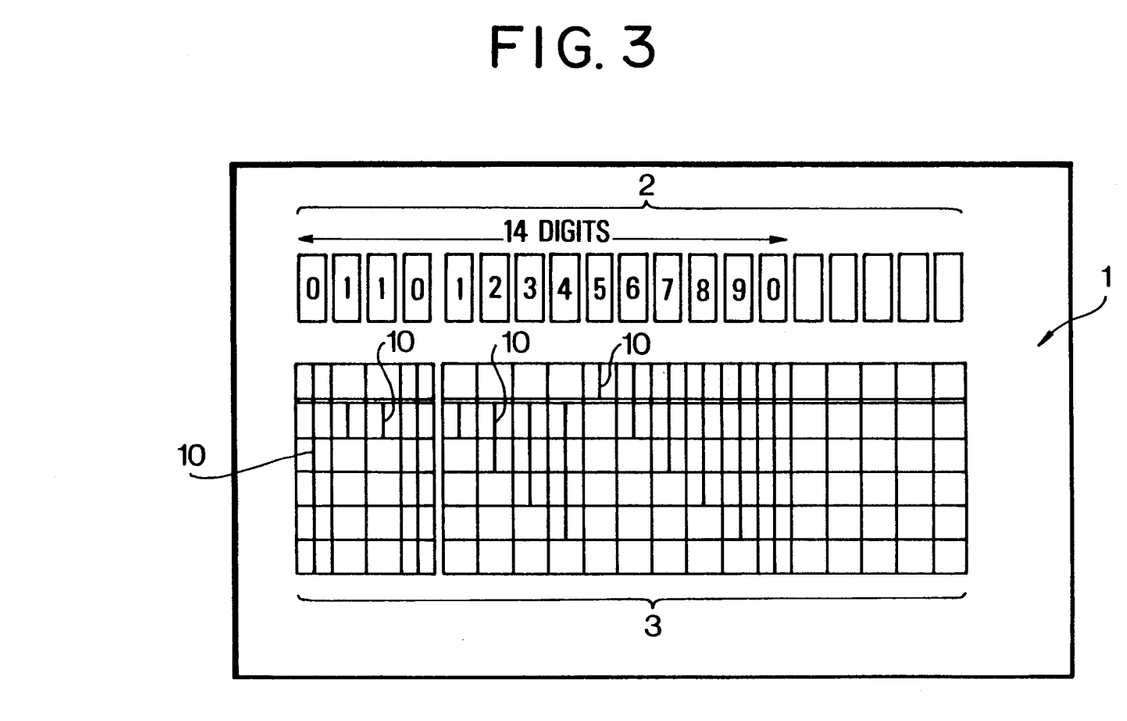
FIG. 3 is a diagram of the information mark of FIG. 2 in which numerals and bar patterns are written.

FIG. 3 shows a state of the squares 2 with numerals "0-9" entered therein and the first squares 4 to the sixth squares 9 of the columns 3 with bar patterns 10 drawn therein, each of which is defined so as to unequivocally represent the corresponding numeral.

In the example of FIG. 3, the numeral "0" is indicated by drawing a bar pattern 10 all the way from the first square 4 to the sixth square 9 in the longitudinal direction of the column 3. The numeral "5" is indicated by drawing a bar pattern 10 only in the first square 4 in the longitudinal direction. The numeral "1" is indicated by drawing a bar pattern 10 only in the second square 5. The numeral "2" is indicated by linearly drawing a bar pattern 10 in the second square 5 and the third square 6. The same rule is applied to the following numeral until the numeral "4" is indicated by linearly drawing a bar pattern 10 all the way from the second square 5 to the fifth square 8.

Further, the numeral "6" is indicated by linearly drawing a bar pattern 10 in the first square 4 and the second square 5. The same rule is applied to the following numeral until the numeral "9" is indicated by linearly drawing a bar pattern 10 all way from the first square 4 to the fifth square 8. The e squares 2 and the columns 3 are provided as the guides for entering the numerals and bar patterns 10 therein, which may also be given by squares in some color to which a later discussed scanning device of an optical reading apparatus is not sensitive. A one-digit numeral is represented by a pair of the square 2 and the column 3 and a two-digit numeral is represented by two pairs of the squares 2 and the columns 3 arranged somewhat close to each other in the horizontal direction. In like manner, a numeral consisting of more digits can be represented by additionally arranging one pair of the square 2 and the column 3 closely to the original pairs for each increase of the digit. A 14-digit numeral is shown in the example of FIG. 3.

The person who writes out the slip will selectively enter the numerals 0-9 in the squares 2 according to the need and draw bar patterns 10 as defined in the foregoing in the columns 3 corresponding to the entered numerals.

Figure 4:
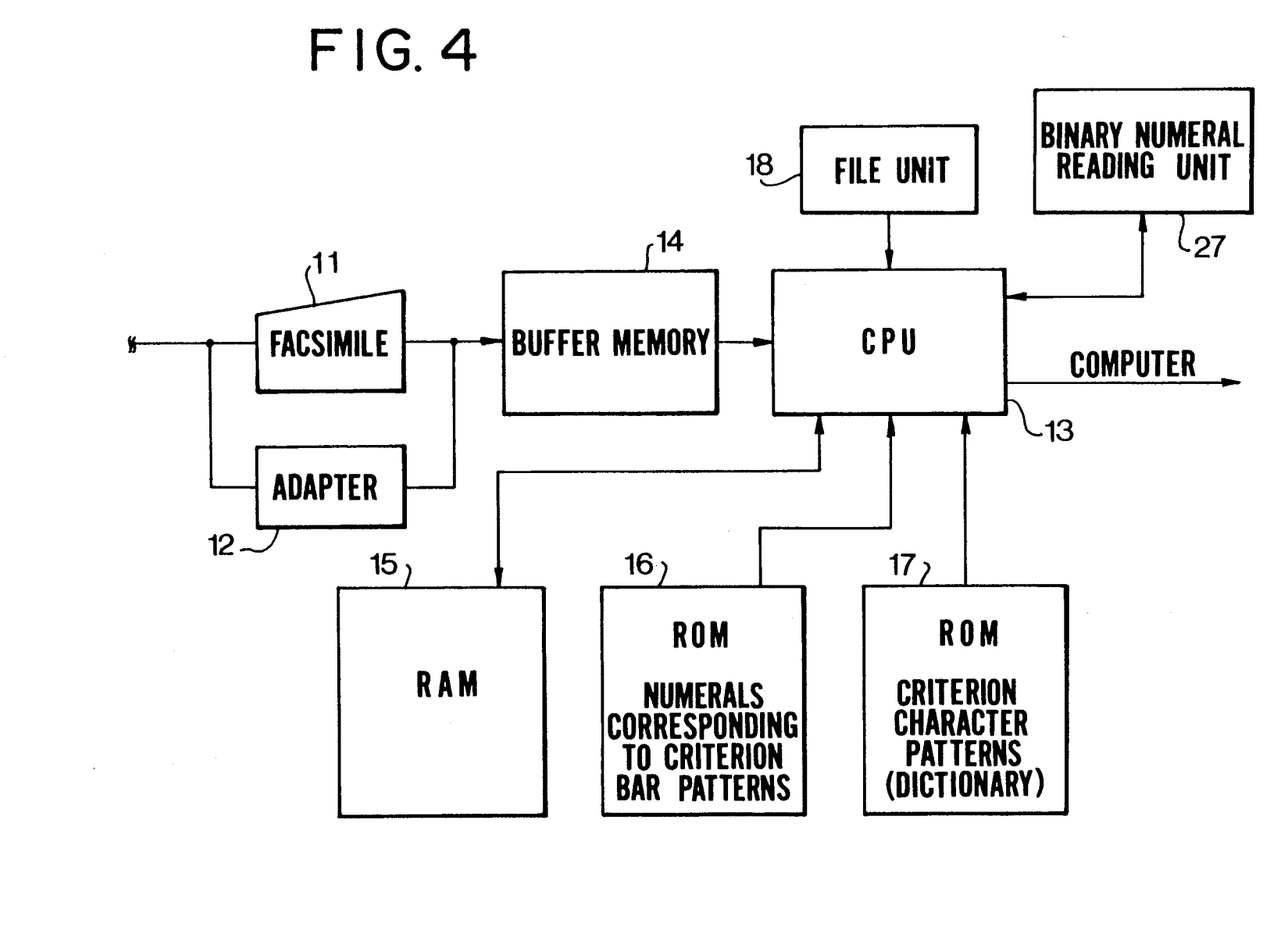
FIG. 4 is a block diagram of an apparatus for automatic slip reading according to the present invention.

FIG. 4 is a block diagram showing an overall arrangement of an automatic input apparatus of the slip, wherein reference numeral 11 denotes a facsimile unit as a scanning device, 12 denotes an adapter operating as a substitute for the facsimile unit, and 13 denotes a central processing unit (CPU).

The facsimile unit 11 and the adapter 12 are capable of communicating with a remote facsimile unit through a public line or a facsimile (F) line. Such an apparatus scans and converts photoelectrically the marks 20-23 etc. delineated on a sheet 1. Reference numeral 14 denotes a buffer memory, 15 denotes a random access memory (RAM), 16, 17, denote read only memories (ROMs), 18 denotes a file unit, and 27 denotes a binary numeral reading unit.

The image data generated by the facsimile unit 11 are supplied to the buffer memory 14. The image data are processed by the CPU 13 on the RAM 15 as a work memory together with data from the ROMs 16, 17, file unit 18, and the binary numeral reading unit 27, and interim result and final result are temporarily stored in the RAM 15.

The final result of the processing is adapted to be delivered and converted to a numerical code through the CPU 13 to a host computer or other data processor. The ROM 16 stores therein in advance the numerals 0-9 and the criterion bar patterns unequivocally corresponding thereto as defined above, whereas the ROM 17 stores therein in advance criterion numeral patterns 0-9 as image data on, for example, a 5×7 dot matrix.

These ROMs 16, 17 are used for recognizing or decoding the frame information marks 23-25.

The binary numeral reading unit 27 is a device for calculating a binary numeral by comparing the lengths of the segments of the information mark 20-22 in sequence of the arrangement.

The file unit 18 is constituted of large-capacity magnetic disks or the like, in which formats of various slips to be specified by the classification mark 20, such as formats of transfer slip, refund slip, remittance slip, tax payment slip, and so on, are stored previously.

Below will be described the operation of the automatic input apparatus of the slip with reference to FIG. 4 to FIG. 7.

When remittance from a company BBBB whose code number is 0110 to a company AAAA whose code number is 1010 is to be made by the use of a transfer slip, the transfer slip for use of the company BBBB is selected and the bank account number, date, and the amount are entered therein in the form of the above described numerals and bar patterns. The sheet 1 of the transfer slip finished with the entry is subjected to scanning by the facsimile unit 11, whereby the classification mark 20 and others are photoelectrically converted into image data to be stored in the main buffer memory 14. Otherwise, the sheet 1 is scanned by a facsimile unit located remotely in the company BBBB, whereby data are transmitted to the company AAAA and are put in the main buffer memory 14 through the adapter 12.

The CPU 13 first separates the classification mark 20 stored in the first storage area from the buffer memory 14 and transfers the same to the RAM 15 so that the data is decoded therein. The CPU 13 first measures the length of the first segment a, and then measures the lengths of the segments b-e in succession and stores the data in the RAM 15.

Figure 5:
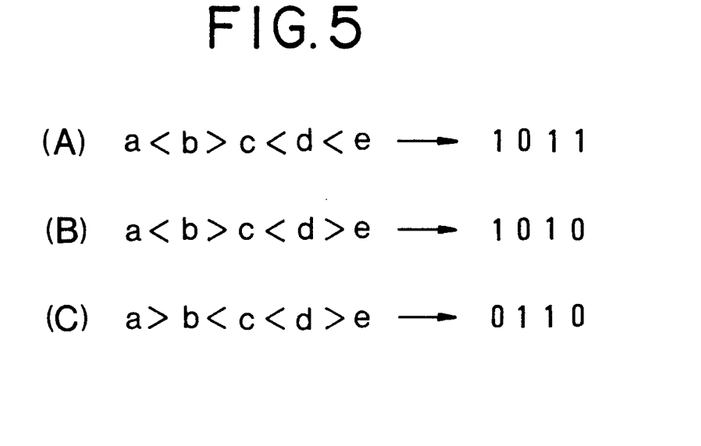
FIG. 5 is a diagram showing a decoding method of a control mark and information marks.

Thereupon, the CPU 13 relatively compares the lengths of the segments a-e between adjoining segments, i.e., a and b, b and c, ..., in succession. By defining such that "1" is represented by the length of a preceding segment being smaller than a subsequent segment, i.e., by a <b, and, conversely, "0" is represented by b>c, a result as indicated in FIG. 5A is obtained. Thus, the CPU 13 decodes the classification mark 20 into a binary numeral 1011. Thereupon, the CPU 13 sets up a storage area with the binary numeral 1011 used as its head.

In like manner, the CPU 13 compares the lengths of the segments drawn in succession constituting the information marks 21 to 22, and therefrom, binary numerals 1010 and 0110 are decoded, respectively. FIG. 5B shows the process of binary decoding of the mark 21 for the addressee and FIG. 5C indicates the process of binary decoding of the mark 22 for the sender, respectively.

Figure 6:
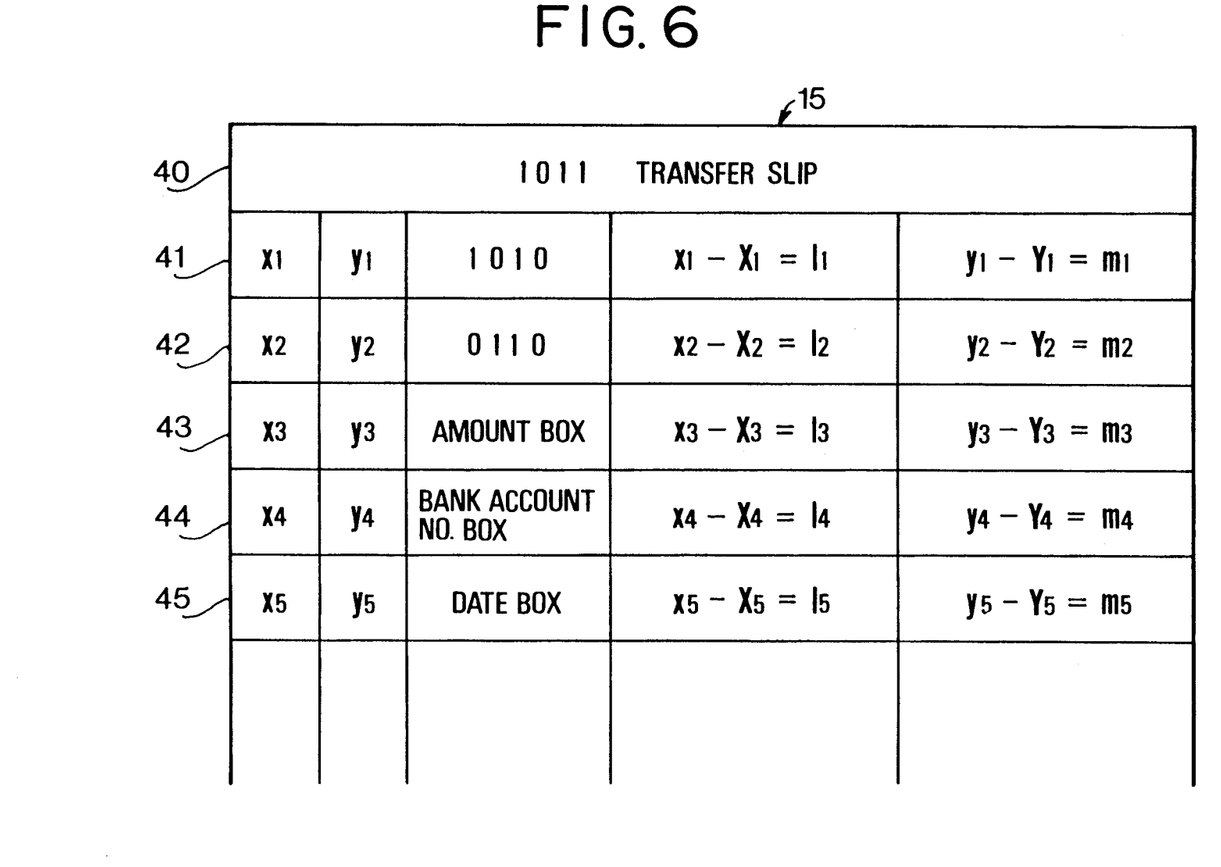
FIG. 6 is a diagram showing a state of records made in a RAM.

These binary numerals 1011, 1010, 0110 are stored in the RAM 15 at their respective addresses 40, 41, 42 as shown in FIG. 6.

Then, from the image data of the segment and the frame information marks 20-25 stored in the buffer memory 14, coordinates of starting positions of the marks 20-25 are read out by the CPU 13. That is, with the starting position of the classification mark 20 taken as the origin (0, 0), the starting point coordinates (x1, y1) of the information mark 21 for the addressee, the starting point coordinates (x2, y2) of the mark 22 for the sender, and the starting position coordinates (x3, y3)-(x5, y5) of the frame information marks 23-25 are read out to be stored in the RAM 15 at the addresses 41-45 as shown in FIG. 6.

Figure 7:
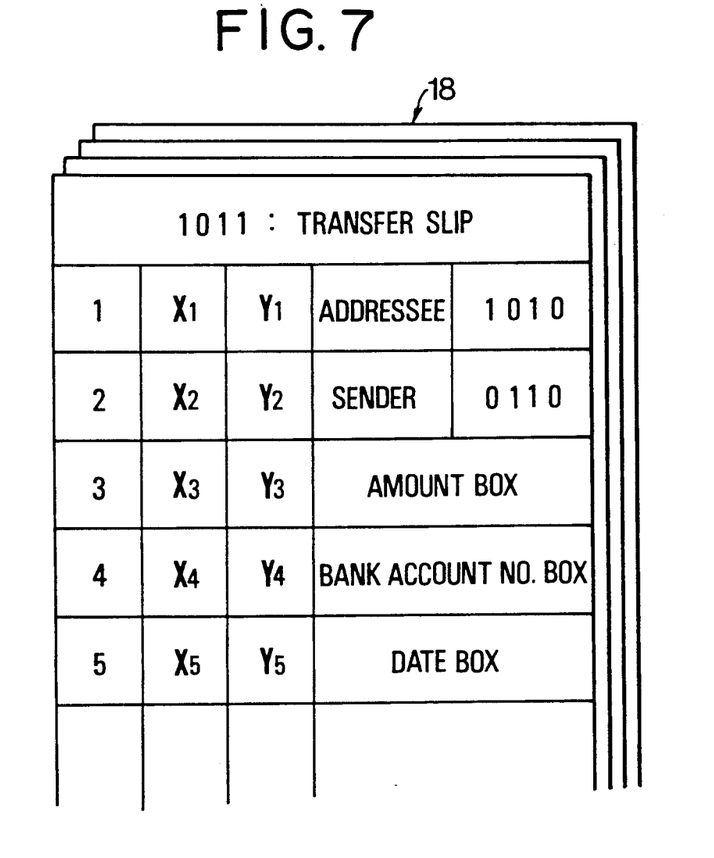
FIG. 7 is a diagram showing a memory arrangement in a file unit.

Thus, the CPU 13 searches through the file unit 18 with the binary numeral 1011 of the classification mark 20 used as a guide and retrieves the data list collected therein under the head of the code 1011 as shown in FIG. 7.

That is, the data list is a format of the transfer slip, from which data in the columns or boxes for the addressee and the sender as well as criterion coordinates (X1, Y1), (X2, Y2), ..., (X5, Y5) of the positions where entries in the boxes for the addressee, sender, amount, bank account No., and the date are to be started, corresponding to the information marks 21-25, can be read out.

The, the CPU 13 determines whether or not the read out coordinates (x1, y1), (x2, y2), ..., (x5, y5) of the information marks 21-25 are in agreement with the predetermined coordinates (X1, Y1), (X2, Y2), ..., (X5, Y5).

That is, the CPU 13 makes comparisons to determine whether or not the read out coordinates (RAM data) of the information marks 21-25 are in agreement with the predetermined coordinates from the file unit 18, and also, whether or not the binary numerals (RAM data) read out from the marks 21 to 22 are in agreement with the criterion binary numerals from the file 18.

More specifically, first, the CPU 13 calculates difference between the read out coordinate x1 of the mark 21 and the criterion coordinate X1, x1-X1=11, and the differences to follow, 12-15.

The CPU 13 then checks whether or not the results of the calculation are in the same direction (of the same symbol) and of the same length. In like manner, it checks whether or not the differences of the coordinates y1-Y1=m1 and the following m2-m5 are in the same direction and of the same length.

If 11-15 and m1-m5 are found to be in opposite directions and of different lengths, the CPU 13 judges that something abnormal has occurred in the scanning of the sheet 1, for example, after scanning of the mark 20 was made, and rejects the following data, because it is considered that some error has occurred in the course of the data transfer from the facsimile unit 11 and therefore the data are not accurate.

If 11-15 are in the same direction and virtually of the same length and m1-m5 are in the same direction and virtually of the same length, the following data are accepted on the assumption that some skipping has been made in the scanning of the sheet 1 by the facsimile unit 11 after the classification mark 20 was read but there has not occurred anything abnormal after the mark 21 was read. If 11-15 and m1-m5 are close to zero, the data transfer is judged to have been normal.

Then, when the difference 11, for example, as to the read out coordinate of the information mark 21 for the addressee is expressed as 11>k (k is an allowance for the difference), that is, even when there is present a certain slippage in position, the CPU 13 takes the read out image data, if the extracted binary numeral and the criterion value 1010 from the file unit 18 are equal to each other, as that addressed to the company of itself (company AAAA) and accepts the transmitted data. In the same way, if the binary numeral extracted from the information mark 22 for the sender is equal to the criterion value 0110, it recognizes the sender as company BBBB, its business acquaintance.

After making acknowledgement of the transfer slip, the CPU 13 turns to recognition of the written data in the frame information marks 23-25. The CPU 13 separates a piece of numeral image data in the square 2 and a piece of bar pattern image data in the column 3 for each digit from the image data for the frame information marks 23-25 in the buffer memory 14.

The numeral image data is compared with criterion numeric patterns from the recognition dictionary in the ROM 17, and a certain recognized candidate numerals arranged in the order of degree of resemblance as well as their degrees of resemblance (%) are calculated to be temporarily stored in the RAM 15.

If, for example, a numeral written by hand in the square 2 is a deformed "1", the CPU 13 may select "1" as the first candidate numeral with a degree of resemblance of 70% and select "7" as the second candidate numeral with a degree of resemblance of 30%, and store these data temporarily in the RAM 15.

Then, the corresponding bar pattern image data is compared with a criterion bar patterns from the ROM 16 as the pattern dictionary. Thereby, patterns of high degrees of resemblance are selected and, from the corresponding numerals, the recognized candidate numerals and the degrees of resemblance (%) are calculated and stored temporarily in the RAM 15. Since the bar pattern 10 is subjected to the comparison only for its length, recognition of its corresponding numeral is considerably easy. Thus, the combination of the numeral "1" and its criterion pattern is selected with a degree of resemblance of 100% and the first candidate numeral "1" and the degree of resemblance 100% are temporarily stored in the RAM 15.

Thereafter, the candidate numeral "1" in the square 2 and its degree of resemblance 70% are first read out from the RAM 15 and the candidate numeral "1" in the column 3 and its degree of resemblance "100%" are read out to be compared with each other. The next candidate numeral "7" in the square 2 and its degree of resemblance 30% and the next candidate numeral in the column 3, or a "NULL" signal because there is no candidate numeral in the present case, are read out and compared with each other.

The CPU 13 recognizes and outputs the numeral, of which the candidate numerals agree with each other and sum of the degrees of resemblance thereof gives the maximum value, as the numeral written in the information mark 23. Namely, from the degree 100% of the first candidate "1", the numeral "1" is selected and its code signal (0001) is output to the computer side.

In the described manner, the numerals of the data entered in the amount box of the information mark 23, the bank account number box of the information mark 24, and the date box of the information mark 25 are recognized and output to the subsequent computer side.

Thus, the kind of the slip is acknowledged by the CPU 13 from the classification mark 20 in the input sheet for the slip. Whereupon, from the information marks 21-22, it is determined whether the slip is addressed to the company of itself (Company AAAA) and it is from its business acquaintance company BBBB. Further, the numerals of data written in the frame information marks 23-25 are recognized, and thereby, necessary data on the slip are read out and delivered to the computer side.

Since duplicate or triplicate logical decisions are made in the described manner, accurate and highly effective data transmission can be executed, and besides, highly accurate numeral recognition can be attained.

In digital data transfer by facsimile transmission, there are frequently cases where the quality of the line of the facsimile network becomes unsteady at the time of the transmission and as a result the positions of entry of the items are deviated, but even if there are present some data which are questionable in appearance by the effect of the transmission condition, the data can be accepted if its normality is confirmed.

Since separative power is high against such noise as stains or wrinkles in the sheet and the condition for preparing a slip is tolerant, the data transfer is possible even if the segments are drawn by hand when in a hurry.

Although, in the above described embodiments, the segment a was, at first, compared with the segment b in length, followed by the comparison between the segments b and c and so on, the first segment a may be compared with the preceding imaginary 0 so that the first bit will always become 1 because $0<1$, and such a 1 may be used for error checking.

The code is not limited to that of binary numeral but may be of other number system with any number used as the base.

Further, the unit patterns of different sizes are not limited to line segments but they may be such patterns as triangles, squares, circles, and bands.

According to the present invention as described so far, effective data transmission can be executed because accurate data are extracted even if there is involved certain noise by making positive decision as to whether the data should be rejected or accepted.

Since numerals and bar patterns written on a slip by hand are independently recognized and the results of the recognition are checked up with each other before a final recognition is made, fully automatic inputting of a hand-written slip is made possible.

By using a facsimile unit as a scanning device and transmitting image data through a public line from a remote branch to a data center in the head office or the like, it is made possible to input accurate data directly to a data processor, without requiring any assistance of human power. Similar data transfer from a facsimile unit in the same site (in the same office) is also possible.

What is claimed is:

1. A method for automatic reading of a slip comprising the steps of photoelectrically converting a control mark made up of line segments of different lengths sequentially arranged in a line for representing kind of format and information marks spaced apart from said control mark, each thereof being made up of line segments of different sizes sequentially arranged in a line, for representing task data delineated on a slip thereby to obtain image data, subjecting the image data to data transfer thereby to input the data to an automatic reading apparatus, calculating coordinates of said control mark and information marks on said slip from said image data, and then, calculating a numerical value by sequentially comparing lengths of adjoining line segments of said control mark thereby to read out a format corresponding to the numerical value from a file unit, and reading out criterion coordinates and criterion numerical values for the information marks representing the task data, comparing said calculated coordinates with these criterion coordinates to determine according to the result of comparison whether or not the following data should be taken in from said slip, and further, calculating numerical values by sequentially comparing lengths of adjoining line segments of said information marks, and comparing these numerical values with said criterion numerical values to determine according to the result of comparison whether or not the following data should be taken in from said slip.

2. A method for automatic reading of a slip according to claim 1 comprising, in addition to and spaced apart from said control mark representing kind of format and said information marks representing the task data, the steps of photoelectrically converting information marks representing numerical data consisting of regions where numerals are written in and regions where bar patterns are written in delineated on a slip thereby to obtain image data, subjecting the image data to data transfer thereby to input the data to an automatic reading apparatus, calculating coordinates of said control mark and both of said information marks on said slip from said image data, and then, calculating a numerical value by sequentially comparing lengths of adjoining line segment of said control mark thereby to read out a format corresponding to the numerical value from a file unit, and reading out criterion coordinates and criterion numerical values for the information marks representing the task data and criterion coordinates for the added information marks representing the numerical data, comparing said calculated coordinates with said criterion coordinates for both said information marks to determine according to the result of comparison whether or not the following data should be taken in from said slip, and then, calculating numerical values by sequentially comparing lengths of line segments of said information marks representing task data and comparing these numerical values with said criterion numerical values to determine according to the result of comparison whether or not the following data should be taken in from said slip, separating the image data of said added information marks representing said numerical data into numerals and bar patterns, comparing each of said image data of numerals with predetermined criterion numeral pattern images thereby to directly recognize the numerals that are written in, and comparing each of said image data of bar patterns with predetermined criterion bar pattern images thereby to recognize the corresponding numerals, and comparing said directly recognized numerals with the numerals recognized by the correspondence thereby to finally recognize the numerals written in said information marks representing said numerical data.

3. An apparatus for automatic reading comprising a slip with delineated thereon a control mark made up of line segments of different lengths sequentially arranged in a line for representing a kind of format, information marks spaced apart from said control mark, each thereof being made up of line segments of different sizes arranged sequentially in a line, for representing task data, and information marks spaced apart from said information marks representing numerical data consisting of regions where numerals are written in and regions where bar patterns are written in, a scanning device receiving said slip as input thereto and outputting image data therefrom, a file unit previously storing therein formats corresponding to control marks, criterion coordinates and criterion numerical values corresponding to information marks representing task data, and criterion coordinates corresponding to information marks representing numerical data, read only memories storing therein in advance image data of numerals 0-9 and image data of predetermined bar patterns corresponding to the numerals 0-9, and a central processing unit for specifying the kind of said slip by comparing said image data with data from said file unit, deciding whether or not following data should be taken in, and comparing said image data with image data from said read only memories thereby to recognize numerals written in said information marks representing the numerical data.

4. An apparatus for automatic reading according to claim 3, wherein said scanning device is a facsimile unit.

5. A method for automatically reading a slip comprising the steps of photoelectrically converting line segments of different lengths sequentially arranged on the slip to obtain image data, transferring the image data to be read by automatic reading apparatus, comparing the lengths of the adjoining line segments of the image data sequentially to calculate a code according to a result of the comparing, and reading a set of format information corresponding to the code from a file unit to specify the kind of slip.

6. A method for automatically reading a slip according to claim 5, wherein said calculated code is a binary numeral to assign 0 or 1 to each digit according to the compared result.

* * * * *

UNITED STATES PATENT AND TRADEMARK OFFICE
CERTIFICATE OF CORRECTION

PATENT NO. : 5,059,775

DATED : October 22, 1991

INVENTOR(S) : Mamoru NAKAYAMA

It is certified that error appears in the above-identified patent and that said Letters Patent is hereby corrected as shown below:

IN THE ABSTRACT:

Line 22, "prcessing" should read --processing--.

Col. 4, line 41, "thich" should read --thick--;

line 60, "closet" should read --closest--; and        line 63, "thich" should read --thick--.

Col. 5, line 17, "numeral" should read --numerals--; and line 19, delete "e".

Signed and Sealed this

Thirtieth Day of March, 1993

Attest:

STEPHEN G. KUNIN

Attesting Officer      Acting Commissioner of Patents and Trademarks